(12) United States Patent
Rajagopalan et al.

(10) Patent No.: US 10,040,141 B2
(45) Date of Patent: Aug. 7, 2018

(54) LASER CONTROLLED INTERNAL WELDING MACHINE FOR A PIPELINE

(71) Applicant: CRC-Evans Pipeline International, Inc., Houston, TX (US)

(72) Inventors: Shankar Rajagopalan, Cypress, TX (US); Siddharth Mallick, Houston, TX (US); Jose C. Bouche, Houston, TX (US)

(73) Assignee: CRC-Evans Pipeline International, Inc., Houston, TX (US)

( * ) Notice: Subject to any disclaimer, the term of this patent is extended or adjusted under 35 U.S.C. 154(b) by 262 days.

(21) Appl. No.: 14/272,914

(22) Filed: May 8, 2014

(65) Prior Publication Data

US 2014/0346163 A1    Nov. 27, 2014

Related U.S. Application Data

(60) Provisional application No. 61/826,628, filed on May 23, 2013.

(51) Int. Cl.
*B23K 9/028* (2006.01)
*B23K 31/02* (2006.01)
(Continued)

(52) U.S. Cl.
CPC .......... *B23K 9/0284* (2013.01); *B23K 9/0286* (2013.01); *B23K 9/0956* (2013.01);
(Continued)

(58) Field of Classification Search
CPC ............ B23K 37/0276; B23K 37/0531; B23K 37/0533; B23K 9/0284; B23K 9/0286;
(Continued)

(56) References Cited

U.S. PATENT DOCUMENTS 1,693,064 A * 11/1928 Tipton ............... B23K 37/0533
                                                  24/270
2,037,962 A    4/1936 Brown
(Continued)

FOREIGN PATENT DOCUMENTS

CN     2825214      10/2006
CN     101332550   12/2008
(Continued)

OTHER PUBLICATIONS

International Search Report and the Written Opinion of the International Searching Authority dated Mar. 29, 2016 in corresponding International Application No. PCT/US2015/062558 (46 pages).
(Continued)

*Primary Examiner* — Michael G Hoang
(74) *Attorney, Agent, or Firm* — Pillsbury Winthrop Shaw Pittman LLP

(57) ABSTRACT

The present invention is directed to a system for welding together segments of a pipeline. The system includes an external alignment mechanism for externally supporting and manipulating the orientation of pipe segments in order to align relative segments. The system also includes an internal welding mechanism for applying a weld to an interior face joint of the two abutted pipe segments. The internal welding mechanism including a torch for applying a weld, a laser for tracking the weld profile and guiding an articulating head of the torch, and a camera for visually inspecting the weld after the weld is applied.

20 Claims, 10 Drawing Sheets

(51) Int. Cl.
*B23K 37/02* (2006.01)
*B23K 37/053* (2006.01)
*B23K 9/095* (2006.01)
*B23K 9/127* (2006.01)
*B23K 101/10* (2006.01)

(52) U.S. Cl.
CPC ........ *B23K 9/1274* (2013.01); *B23K 37/0276* (2013.01); *B23K 37/0531* (2013.01); *B23K 37/0533* (2013.01); *B23K 2201/10* (2013.01)

(58) Field of Classification Search
CPC . B23K 9/0956; B23K 9/1274; B23K 2201/10
USPC .... 219/60 A, 61.1, 61.13, 61.3, 61.5, 121.56
See application file for complete search history.

(56) References Cited

U.S. PATENT DOCUMENTS

| | | |
|---|---|---|
| 2,259,367 A | 10/1941 | Ely et al. |
| 2,308,340 A | 1/1943 | Newlon |
| 2,400,737 A | 5/1946 | Brown |
| 2,780,194 A | 2/1957 | Croswell |
| 2,816,208 A | 12/1957 | Stewart |
| 2,833,910 A | 5/1958 | Stanton et al. |
| 2,936,517 A | 5/1960 | Brown et al. |
| 3,008,037 A | 11/1961 | Harmes |
| 3,009,048 A | 11/1961 | Stanley |
| 3,009,049 A | 11/1961 | Stanley |
| 3,110,277 A | 11/1963 | Dixon et al. |
| 3,164,712 A | 1/1965 | Paton et al. |
| 3,209,115 A | 9/1965 | Iperen |
| 3,261,529 A | 7/1966 | Pagan |
| 3,379,853 A | 4/1968 | Domizi |
| 3,424,887 A | 1/1969 | Fehlman |
| 3,461,264 A | 8/1969 | Nelson et al. |
| 3,508,433 A | 4/1970 | Bustin |
| 3,534,199 A | 10/1970 | Downey et al. |
| 3,539,915 A | 11/1970 | Walters et al. |
| 3,551,636 A | 12/1970 | Nelson |
| 3,611,541 A | 10/1971 | Garrett |
| 3,612,808 A | 10/1971 | Nelson et al. |
| 3,645,105 A | 2/1972 | Nolan, Jr. |
| 3,646,309 A | 2/1972 | Smith, Jr. et al. |
| 3,668,359 A | 6/1972 | Emmerson |
| 3,750,451 A | 8/1973 | Nolan |
| 3,761,005 A | 9/1973 | Baxter et al. |
| 3,764,056 A | 10/1973 | Edwards et al. |
| 3,895,209 A | 7/1975 | Moriki et al. |
| 3,961,741 A | 6/1976 | Klein |
| 3,974,356 A | 8/1976 | Nelson et al. |
| 3,979,041 A | 9/1976 | Kaneyama et al. |
| 3,992,818 A | 11/1976 | Clausen |
| 4,019,016 A | 4/1977 | Friedman et al. |
| 4,039,115 A | 8/1977 | Randolph et al. |
| 4,092,950 A | 6/1978 | Hart |
| 4,101,067 A | 7/1978 | Sloan et al. |
| 4,144,992 A | 3/1979 | Omae et al. |
| 4,152,568 A | 5/1979 | Yamaguchi et al. |
| 4,213,345 A | 7/1980 | Dufour |
| 4,218,604 A | 8/1980 | Masaoka et al. |
| 4,223,197 A | 9/1980 | Imai et al. |
| 4,273,985 A | 6/1981 | Paton et al. |
| 4,283,617 A | 8/1981 | Merrick et al. |
| 4,285,460 A | 8/1981 | Clavin |
| 4,360,961 A | 11/1982 | Chlebowski |
| 4,380,696 A | 4/1983 | Masaki |
| 4,443,677 A | 4/1984 | Desaw |
| 4,483,106 A | 11/1984 | Wachs et al. |
| 4,491,718 A | 1/1985 | Cook et al. |
| 4,531,192 A | 7/1985 | Cook |
| 4,565,003 A | 1/1986 | McLeod |
| 4,573,666 A | 3/1986 | Nomura et al. |
| 4,575,611 A | 3/1986 | Bertossa |
| 4,638,984 A | 1/1987 | Puisais et al. |
| 4,666,138 A | 5/1987 | Dearman |
| 4,715,809 A | 12/1987 | Langhoff et al. |
| 4,750,662 A | 6/1988 | Kagimoto |
| 4,831,233 A | 5/1989 | Gordon |
| 4,838,477 A | 6/1989 | Roach et al. |
| 4,839,495 A | 6/1989 | Kitera et al. |
| 4,927,091 A | 5/1990 | Weiss et al. |
| 4,959,523 A | 9/1990 | Fihey et al. |
| 5,097,110 A | 3/1992 | Hamada |
| 5,148,000 A | 9/1992 | Tews |
| 5,165,160 A | 11/1992 | Poncelet |
| 5,288,963 A | 2/1994 | Jusionis |
| 5,343,016 A | 8/1994 | Davis et al. |
| 5,435,478 A | 7/1995 | Wood et al. |
| 5,435,479 A | 7/1995 | Puzey et al. |
| 5,474,225 A | 12/1995 | Geier et al. |
| 5,481,085 A | 1/1996 | Kovacevic et al. |
| 5,593,605 A | 1/1997 | Jones |
| 5,601,225 A | 2/1997 | Wood et al. |
| 5,685,996 A | 11/1997 | Ricci |
| 5,685,999 A | 11/1997 | Wiedemann et al. |
| 5,706,863 A | 1/1998 | Matherne et al. |
| 5,728,992 A | 3/1998 | Swidwa |
| 5,738,725 A | 4/1998 | Bernstein, Jr. |
| 5,796,069 A | 8/1998 | Jones et al. |
| 5,816,479 A | 10/1998 | Matherne et al. |
| 5,837,966 A | 11/1998 | Timmons, Jr. |
| 5,865,430 A | 2/1999 | Conover et al. |
| 5,925,268 A | 7/1999 | Britnell |
| 6,027,007 A | 2/2000 | Bosio |
| 6,044,769 A | 4/2000 | Oka et al. |
| 6,075,220 A | 6/2000 | Essien et al. |
| 6,084,203 A | 7/2000 | Bonigen |
| 6,098,866 A | 8/2000 | Tsuchiya et al. |
| 6,109,503 A | 8/2000 | Parker |
| 6,188,041 B1 | 2/2001 | Kim et al. |
| 6,220,498 B1 | 4/2001 | Gordon et al. |
| 6,230,072 B1 | 5/2001 | Powell et al. |
| 6,290,786 B1 | 9/2001 | Brown et al. |
| 6,325,277 B1 | 12/2001 | Collie |
| 6,333,699 B1 | 12/2001 | Zierolf |
| 6,417,488 B1 | 7/2002 | Takeuchi et al. |
| 6,583,386 B1 | 6/2003 | Ivkovich |
| 6,596,961 B2 | 7/2003 | Ehlers et al. |
| 6,605,800 B1 | 8/2003 | Schick et al. |
| 6,752,175 B1 | 6/2004 | Willschuetz et al. |
| 6,759,968 B2 | 7/2004 | Zierolf |
| 6,840,433 B2 | 1/2005 | Vermaat |
| 6,850,161 B1 | 2/2005 | Elliott et al. |
| 6,909,066 B2 | 6/2005 | Zheng et al. |
| 6,917,176 B2 | 7/2005 | Schempf et al. |
| 6,924,452 B2 | 8/2005 | Kimura |
| 6,926,069 B1 | 8/2005 | Roffelsen |
| 7,014,100 B2 | 3/2006 | Zierolf |
| 7,032,809 B1 | 4/2006 | Hopkins |
| 7,091,447 B2 | 8/2006 | Kim et al. |
| 7,114,881 B2 | 10/2006 | Belloni et al. |
| 7,159,654 B2 | 1/2007 | Ellison et al. |
| 7,182,025 B2 | 2/2007 | Ghorbel et al. |
| 7,205,503 B2 | 4/2007 | Reynolds et al. |
| 7,277,014 B1 | 10/2007 | Waterhouse et al. |
| 7,282,663 B2 | 10/2007 | Alford et al. |
| 7,474,221 B2 | 1/2009 | Den Boer et al. |
| 7,484,625 B2 | 2/2009 | Scott et al. |
| 7,510,218 B2 | 3/2009 | Holdren |
| 7,540,401 B2 | 6/2009 | Vermaat |
| 7,577,285 B2 * | 8/2009 | Schwarz .............. B23K 9/0956 219/602 |
| 7,657,082 B2 | 2/2010 | Kubo et al. |
| 7,661,574 B1 | 2/2010 | McGushion |
| 7,675,422 B2 | 3/2010 | Stevens et al. |
| 7,677,439 B2 | 3/2010 | Zierolf |
| 7,688,210 B2 | 3/2010 | Staff |
| 7,713,000 B2 | 5/2010 | Verkuijl et al. |
| 7,774,917 B2 | 8/2010 | Anderson et al. |
| 7,780,065 B2 | 8/2010 | Vermaat |
| 7,798,023 B1 | 9/2010 | Hoyt et al. |
| 7,802,714 B1 | 9/2010 | Kuchuk-Yatsenko et al. |
| 7,915,561 B2 | 3/2011 | Kossowan |
| 7,966,860 B2 | 6/2011 | Dijkstra |

(56) References Cited

U.S. PATENT DOCUMENTS

| | | |
|---|---|---|
| 8,016,037 B2 | 9/2011 | Bloom et al. |
| 8,091,775 B2 | 1/2012 | Zierolf |
| 8,115,138 B2 | 2/2012 | Jacovetty et al. |
| 8,205,503 B2 | 6/2012 | Cox |
| 8,313,016 B2 | 11/2012 | Dagenais |
| 8,328,071 B2 | 12/2012 | Lavalley et al. |
| 8,350,184 B2 | 1/2013 | Behr et al. |
| 8,353,443 B2 | 1/2013 | Sugiyama et al. |
| 8,378,841 B2 | 2/2013 | Stevens et al. |
| 8,389,902 B2 | 3/2013 | McKinley |
| 8,534,530 B2 | 9/2013 | Biggs |
| 8,590,769 B2 | 11/2013 | Lavalley et al. |
| 8,658,941 B2 | 2/2014 | Albrecht |
| 8,689,836 B2 | 4/2014 | Hudson |
| 8,695,198 B2 | 4/2014 | Dagenais |
| 8,714,433 B1 | 5/2014 | Snead et al. |
| 8,777,201 B2 | 7/2014 | Dagenais |
| 8,777,482 B2 | 7/2014 | Pfitzner et al. |
| 8,782,863 B2 | 7/2014 | Pfeiffer |
| 8,864,012 B2 | 10/2014 | Bonelli |
| 8,955,733 B2 | 2/2015 | Vanderpol et al. |
| 8,973,244 B2 | 3/2015 | Lavalley et al. |
| 9,030,324 B2 | 5/2015 | Christiansen et al. |
| 9,038,670 B2 | 5/2015 | Vinoy |
| 9,183,222 B2 | 11/2015 | Gale et al. |
| 9,304,204 B2 | 4/2016 | Krauhausen et al. |
| 2003/0188589 A1 | 10/2003 | Harthorn et al. |
| 2004/0009042 A1 | 1/2004 | Belloni et al. |
| 2004/0032597 A1 | 2/2004 | Esmiller |
| 2005/0103766 A1* | 5/2005 | Iizuka .............. B23K 9/0216 219/124.34 |
| 2005/0247686 A1 | 11/2005 | Child |
| 2006/0070987 A1 | 4/2006 | Daniel |
| 2007/0023185 A1 | 2/2007 | Hall et al. |
| 2007/0145129 A1 | 6/2007 | Perkin et al. |
| 2007/0210047 A1* | 9/2007 | Child .............. B23K 9/1274 219/124.34 |
| 2007/0256288 A1 | 11/2007 | Vermaat |
| 2009/0212024 A1 | 8/2009 | Muller et al. |
| 2010/0126968 A1 | 5/2010 | Page |
| 2010/0230953 A1 | 9/2010 | Baylot et al. |
| 2011/0198316 A1* | 8/2011 | Legori ............ B23K 37/0531 219/61.1 |
| 2011/0297316 A1 | 12/2011 | Jackson et al. |
| 2012/0074631 A1 | 3/2012 | Dagenais |
| 2012/0126008 A1 | 5/2012 | Binmore |
| 2012/0174372 A1 | 7/2012 | Dagenais |
| 2012/0187096 A1 | 7/2012 | Schmid et al. |
| 2012/0201348 A1 | 8/2012 | Knight et al. |
| 2012/0213937 A1 | 8/2012 | Lavalley et al. |
| 2012/0215354 A1 | 8/2012 | Krasny et al. |
| 2012/0257042 A1 | 10/2012 | McKaigue et al. |
| 2012/0297652 A1 | 11/2012 | Halvorsen |
| 2013/0008548 A1 | 1/2013 | Bowers |
| 2013/0026148 A1 | 1/2013 | Aoyama et al. |
| 2013/0048619 A1 | 2/2013 | Doyle et al. |
| 2013/0075380 A1 | 3/2013 | Albrech et al. |
| 2013/0112677 A1 | 5/2013 | Christopher et al. |
| 2013/0119037 A1 | 5/2013 | Daniel |
| 2013/0126503 A1 | 5/2013 | McKinley |
| 2014/0001166 A1 | 1/2014 | Peters et al. |
| 2014/0006227 A1 | 1/2014 | Griggs et al. |
| 2014/0042207 A1 | 2/2014 | Lavalley et al. |
| 2014/0091129 A1 | 4/2014 | Peters et al. |
| 2014/0137389 A1 | 5/2014 | Dagenais |
| 2014/0191904 A1 | 7/2014 | Illerhaus |
| 2014/0266009 A1 | 9/2014 | Comello et al. |
| 2014/0294285 A1 | 10/2014 | Duckworth et al. |
| 2014/0346163 A1 | 11/2014 | Rajagopalan et al. |
| 2015/0034629 A1 | 2/2015 | Sherrill et al. |
| 2015/0108223 A1 | 4/2015 | Weitzhandler |
| 2015/0114507 A1 | 4/2015 | Warren |
| 2015/0146216 A1 | 5/2015 | Krauhausen et al. |
| 2015/0226872 A1 | 8/2015 | Doany et al. |
| 2015/0248569 A1 | 9/2015 | Rushing |
| 2015/0273636 A1 | 10/2015 | Rajagopalan et al. |
| 2015/0330551 A1 | 11/2015 | Van Nie et al. |
| 2015/0360332 A1 | 12/2015 | Singh et al. |
| 2016/0032707 A1 | 2/2016 | Bowman |
| 2016/0032713 A1 | 2/2016 | Hallundbak et al. |
| 2017/0182605 A1 | 6/2017 | Rajagopalan et al. |
| 2017/0274467 A1 | 9/2017 | Rajagopalan et al. |

FOREIGN PATENT DOCUMENTS

| | | |
|---|---|---|
| CN | 103826788 | 5/2014 |
| CN | 104010756 | 8/2014 |
| DE | 20 2006 004122 | 5/2006 |
| EP | 0 193 812 A2 | 9/1986 |
| EP | 2 340 908 A1 | 7/2011 |
| GB | 1 261 814 | 1/1972 |
| GB | 1 386 926 | 3/1975 |
| GB | 2 214 118 | 8/1989 |
| JP | 58-212890 | 12/1983 |
| JP | 59-30495 | 2/1984 |
| JP | 59-92194 | 5/1984 |
| JP | 60072673 | 4/1985 |
| JP | 60082284 | 5/1985 |
| JP | 02-127976 A | 5/1990 |
| JP | 03013270 | 1/1991 |
| JP | 03090282 | 4/1991 |
| JP | 03090283 | 4/1991 |
| JP | 7-116842 | 5/1995 |
| JP | 07155949 | 6/1995 |
| JP | 10-244367 | 9/1998 |
| JP | 11-10486 | 1/1999 |
| JP | 2001170784 | 6/2001 |
| JP | 2007-205941 | 8/2007 |
| JP | 2012-218031 | 11/2012 |
| KR | 10-0598523 | 7/2006 |
| KR | 10-1143532 | 5/2012 |
| KR | 2012-0044131 A | 5/2012 |
| SU | 1199544 | 12/1985 |
| SU | 1741999 | 6/1992 |
| WO | WO 90/06205 A1 | 6/1990 |
| WO | WO 00/41843 | 7/2000 |
| WO | 01/70446 | 9/2001 |
| WO | WO0200385 | 1/2002 |
| WO | 2007097589 A2 | 8/2007 |
| WO | WO 2009/059776 | 5/2009 |
| WO | 2010/002269 | 1/2010 |
| WO | 2010/046390 | 4/2010 |
| WO | 2011/012998 | 2/2011 |
| WO | 2013/171589 | 11/2013 |
| WO | 2015/148765 | 10/2015 |
| WO | 2016/033568 | 3/2016 |
| WO | 2016/153562 | 9/2016 |

OTHER PUBLICATIONS

"Explorer II—Wireless Self-powered Visual and NDE Robotic Inspection System for Live Gas Pipelines", National Energy Technology Laboratory, DE-FC26-04NT42264, downloaded from URL: http://www.netl.doe.gov/research/oil-and-gas/project-summaries/completed-td/de-fc26-04nt42264 (4 pages).

"Final Report: Explorer-II: Wireless Self-powered Visual and NDE Robotic Inspection System for Live Gas Distribution Mains", Oil & Natrural Gas Technology,DE-FC26-04NT-42264, downloaded from URL: https://www.netl.doe.gov/File%20Library/Research/Oil-Gas/NT42264_FinalReport.pdf (120 pages).

Non-Final Office Action dated Jun. 20, 2016 in corresponding U.S. Appl. No. 14/228,708 (12 pages).

Non-Final Office Action dated Aug. 11, 2016 in corresponding U.S. Appl. No. 14/272,914.

International Search Report dated Jul. 23, 2015 in corresponding International Patent Application No. PCT/US2015/022665.

Final Office Action issued in corresponding U.S. Appl. No. 14/272,914 dated Jan. 26, 2017.

International Preliminary Report on Patentability issued in corresponding International Patent Application No. PCT/US2015/047603, dated Mar. 9, 2017.

(56) References Cited

OTHER PUBLICATIONS

International Search Report and Written Opinion issued for corresponding International Patent Application No. PCT/US2015/047603, dated Jan. 5, 2016 (16 pages).
International Search Report and Written Opinion issued for corresponding International Patent Application No. PCT/US2015/022665, dated Jul. 23, 2015 (11 pages).
International Preliminary Report on Patentability issued for corresponding International Patent Application No. PCT/US2015/022665, dated Oct. 13, 2016 (10 pages).
Examination Report issued for corresponding Australian Patent Application No. 2014268528, dated. Apr. 28, 2017.
Examination Report issued for corresponding Chinese Patent Application No. 201480029722.8, dated May 15, 2017.
Examination Report issued for corresponding Chinese Patent Application No. 201480029722.8, dated Jul. 18, 2016.
Search Report and Written Opinion issued for corresponding International Application No. PCT/US2014/039148, dated Oct. 1, 2014.
International Preliminary Report on Patentability issued for corresponding International Application No. PCT/US2014/039148, dated Dec. 3, 2015.
Non-Final Office Action issued in corresponding U.S. Appl. No. 14/228,708, dated Mar. 1, 2017.
Extended European Search Report, including Search Opinion, issued in corresponding European Patent Application No. 14800710.7, dated Jan. 23, 2017.
Extended European Search Report, including Search Opinion, issued in corresponding European Patent Application No. 15768987.8, dated Oct. 20, 2017.
Notice of Allowance issued in corresponding U.S. Appl. No. 14/228,708, dated Jul. 17, 2017.
Office Action issued in corresponding Chinese Patent Application No. 201580016820.2, dated Jul. 19, 2017.
International Preliminary Report on Patentability issued for corresponding International Patent Application No. PCT/US2015/062558, dated Oct. 5, 2017.
Search Report and Written Opinion issued for corresponding International Application No. PCT/US2017/042612, dated Nov. 13, 2017.
Search Report and Written Opinion issued for corresponding International Application No. PCT/IB2017/055221, dated Nov. 30, 2017.
Office Action issued in corresponding Chinese Patent Application No. 201580016820.2, dated Apr. 4, 2018.
Office Action issued in corresponding Chinese Patent Application No. 201580045390.7, dated Apr. 10, 2018.
Office Action and Search Report issued in corresponding Russian Patent Application No. 2015154971, dated Apr. 27, 2018.
Examination Report issued for corresponding Chinese Patent Application No. 201480029722.8, dated Apr. 4, 2018.
European Search Report issued for corresponding European Patent Application No. 15836899.3, dated May 24, 2018.

\* cited by examiner

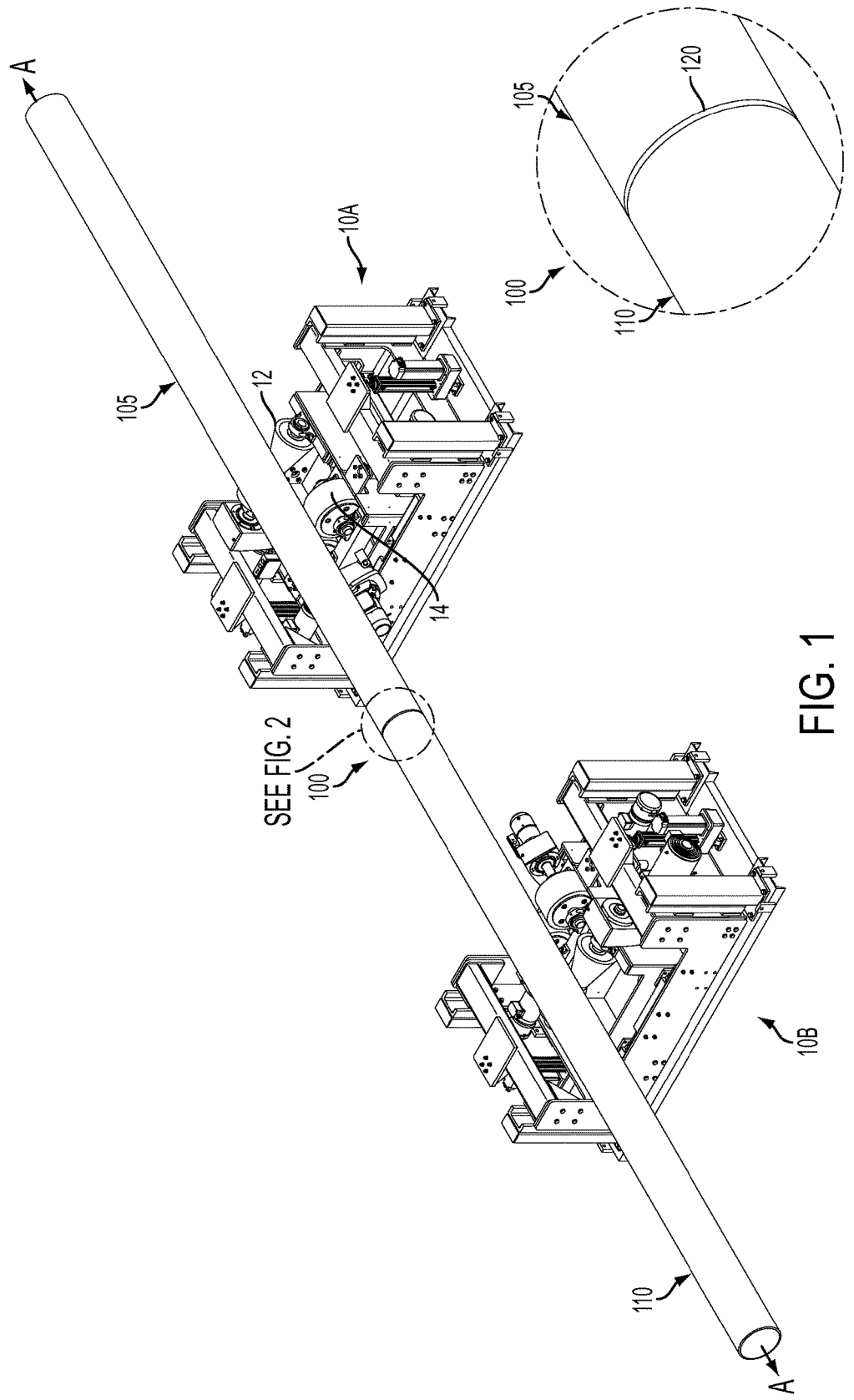

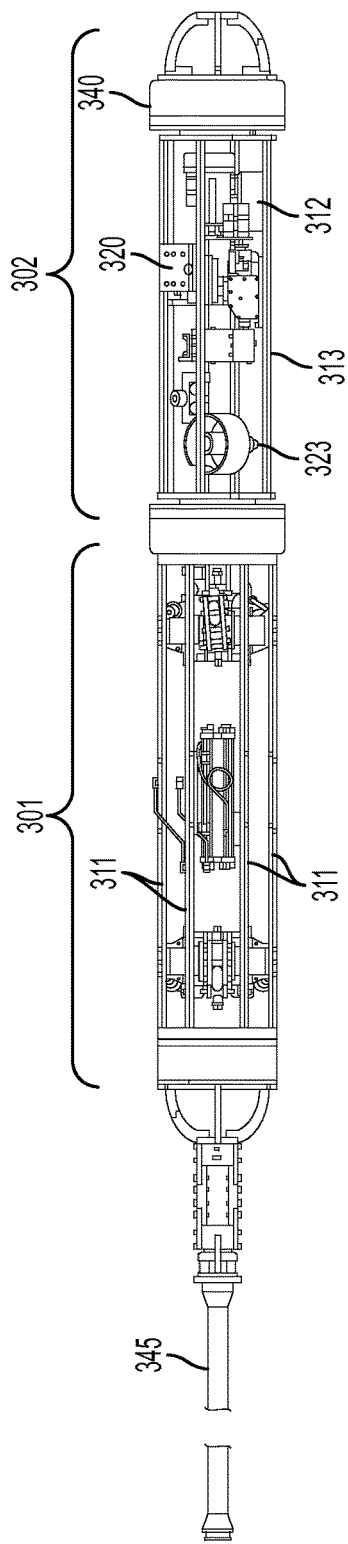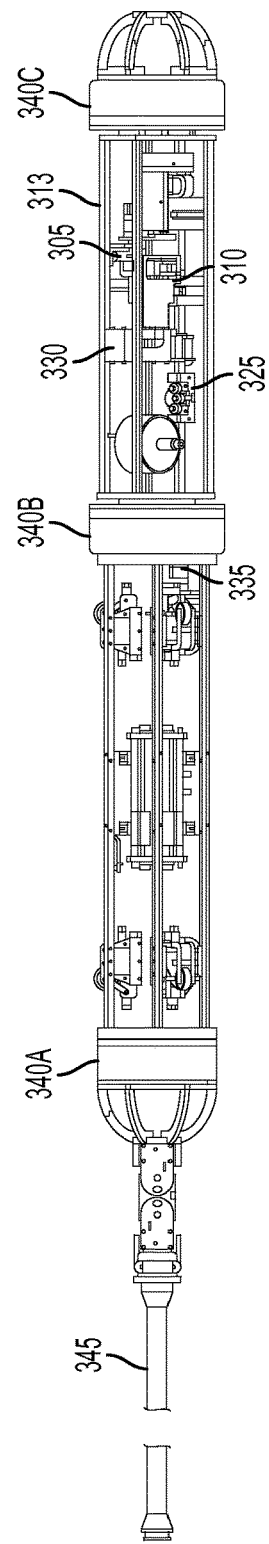
FIG. 6
FIG. 7

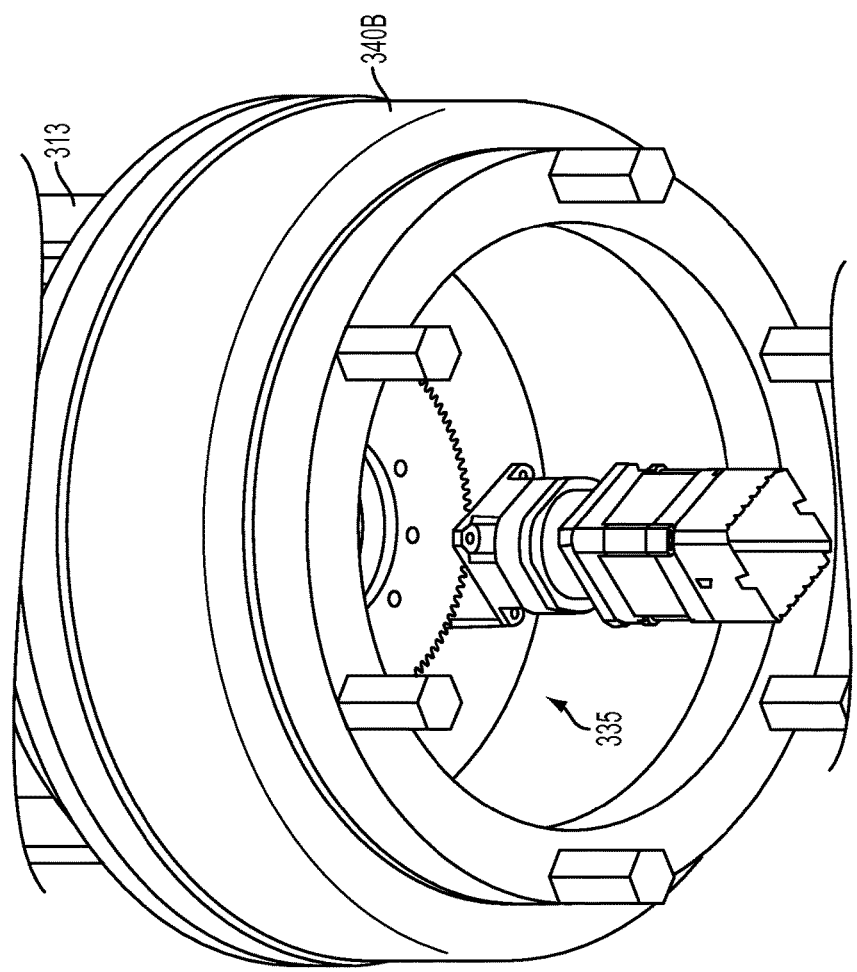

LASER CONTROLLED INTERNAL WELDING MACHINE FOR A PIPELINE

CROSS-REFERENCE TO RELATED APPLICATIONS

This application claims priority, under 35 U.S.C. § 119 (a)-(d), to U.S. Provisional application 61/826628, filed May 23, 2013, the contents of which are incorporated herein by reference in its entirety.

FIELD OF THE INVENTION

The present invention is directed to a system for aligning and connecting two pipe segments together by welding.

BACKGROUND OF THE INVENTION

Conventional internal welders frequently include internal alignment mechanisms that expand radially outward to contact the interior of the pipe. Alignment of the two pipe segments is accomplished from inside when extension members of a central member contact the interior of the pipe relatively close to the pipe segment joint faces on either side of the joint as shown in U.S. Pat. Nos. 3,461,264; 3,009,048; 3,551,636; 3,612,808 and GB 1261814 (which is each incorporated herein by reference in its entirety). In order to weld the joint, the structure of the expander must allow sufficient space to accommodate a rotating torch. It would therefore be advantageous to provide internal alignment that allows sufficient space for a rotating or articulating torch or to align the pipe segments externally so as to eliminate the need for an internal expander which may create significant internal clutter.

In addition, the conventional process of internal welding usually involves internal or external alignment and an insertion of the internal welder so that torches align with the face joint. In this process it is sometimes difficult to assess the accuracy of positioning of the internal welder in general and the torch in particular. It is even more difficult to assess the accuracy of the position of the torch as the torch traverses the inside of the pipe along its orbital path during welding. It would therefore be advantageous to provide a system of tracking the structure of or positioning of pipe edges at the pipe interface in order to control the torch by use of the tracked condition of the interface. Specifically, it would be advantageous to first track a profile of the interface with a laser before sending a signal to an electronic controller to direct the position and orientation of the welding torch relative to the tracked pipe interface profile.

Furthermore, conventional pipeline welding systems that employ external alignment mechanisms typically support two segments on rollers and manipulate the position and orientation of the segments until alignment is satisfactory. Whether an alignment is satisfactory typically will depend, for example, on industry acceptable high-low gauges that are fairly accurate but are manually operated and positioned at discrete locations and not over the entire pipe interface. In any case, the profile or structure of the interface as observed from the inside of the pipe is not typically a consideration for quality of alignment. It would therefore be advantageous to provide an alignment system in which information about the interface profile as read by the laser is used as an input parameter during the external alignment process. Specifically, it would be advantageous to provide the information from the torch controlling laser to the controller which would utilize the information in controlling external alignment mechanisms.

Moreover, conventional pipeline systems for welding pipe segments will typically lack a capability to visually inspect the weld applied by the torch. It therefore would be advantageous to provide a camera that followed the torch weld application and a display for showing an image of the weld in order for an operator to visually inspect the quality of the weld.

Other advantages of the present disclosure will be apparent by review of this disclosure. Patentable advantages are not limited to those highlighted in this section.

SUMMARY OF THE INVENTION

The present invention system for aligning and welding together the faces of two pipe segments includes an external alignment mechanism and a welding mechanism. The external alignment mechanisms may be as sophisticated as the line up modules shown in the drawings or as simple as a tipton clamp as illustrated in U.S. Pat. No. 1,693,064. The mechanisms used may also be suitable for on or off shore pipeline construction. U.S. Pat. No. 1,693,064 is incorporated herein by reference in its entirety. Whatever mechanism is employed, the external alignment mechanism supports and adjustably positions each segment so that the segments are substantially collinear or axially aligned along their longitudinal axes.

The external alignment mechanism may support a pipe segment and may include powered features that allow the position and orientation of the pipe to be adjusted. Specifically, the external alignment mechanism may include rollers that allow the pipe to move longitudinally. The pipe may also be supported by rollers that allow the pipe to be rolled about the longitudinal axis and moved up and down. The position and orientation adjustments may be automatic as by motor power or hydraulic power controlled at an operator station or fed into a central controller that automatically controls an aligns the segments based on predetermined alignment parameters or feedback from an internal laser reading an interface or joint profile.

The welding mechanism is preferably an internal welding machine that applies a weld (e.g., a gas metal arc weld "GMAW") from inside the pipe segments to a face or edge joint of the segment and into a v-shaped opening formed by chamfered edges of the two pipe segments (other cross-sectional shapes other than a V may be used also). The welding mechanism includes a carriage capable of engaging the inner walls of the pipe to secure or lock itself within the pipe in a fixed position and a welding portion rotatably supported from the carriage within the pipe. Specifically, the internal welder is located within the aligned pipe and then positioned longitudinally so that a weld head or torch is in longitudinal proximity to the edge joint. The welding mechanism also includes a rotary mechanism for rotating the welding portion relative to the carriage. The weld head or torch is rotatably supported on the welding portion about the pipe longitudinal axis so that the torch may closely follow the entire interior joint interface in an orbital rotation. Specifically, during welding, the torch of the articulating head follows the edge joint around the entire interior circumference of the pipe applying weld material. In addition to circular rotation relative to the carriage, various control elements may move the weld head axially along the pipe relative to the carriage, radially toward and away from the joint, and pivotally about a point or axis (e.g., an axis parallel or perpendicular to pipe longitudinal axis A-A). A controller may direct the torches pivoting. These degrees of freedom of articulation allow the weld head to be very effective and efficient in filling in interface profiles optimally and where necessary.

The welding mechanism also includes a laser tracking mechanism that works in conjunction with the torch of the welding portion to sense interface joint profile or/and weld material profile to apply weld material to the edge joint in the appropriate location and amount. The laser mechanism surveys the weld and sends a signal to the controller of the articulating weld head to control movement of the head around the entire edge joint. Specifically, the torch follows the laser as the weld head control system continuously receives weld profile information from the edge joint. The information is then used to continuously adjust the torch to achieve the desired weld structure.

In addition to the laser tracking mechanism, the system may include a 2D camera for visual inspection of the weld. The 2D camera is mounted on the welding portion and follows the torch so that an operator can inspect the weld as soon as it is created by the torch. A visual signal is delivered to an external operator display. For example, the 2D camera may be a color camera and a change in coloration may indicate a weld defect to the operator. A perceived change in profile may also indicate a defect.

BRIEF DESCRIPTION OF THE DRAWINGS

FIG. 1 illustrates a perspective view of a pipe welding system of the present invention showing two externally aligned pipe segments supported on alignment mechanisms.

FIG. 2 illustrates an enlarged external view of a pipe interface of two segments to be welded using the system of FIG. 1.

FIGS. 6 and 7 illustrate side views of the welding mechanism of FIG. 1.

FIG. 13 illustrates an enlarged perspective view of the rotary mechanism of the system of FIG. 1.

Like reference numerals have been used to identify like elements throughout this disclosure.

DETAILED DESCRIPTION OF THE INVENTION

Figure 3:
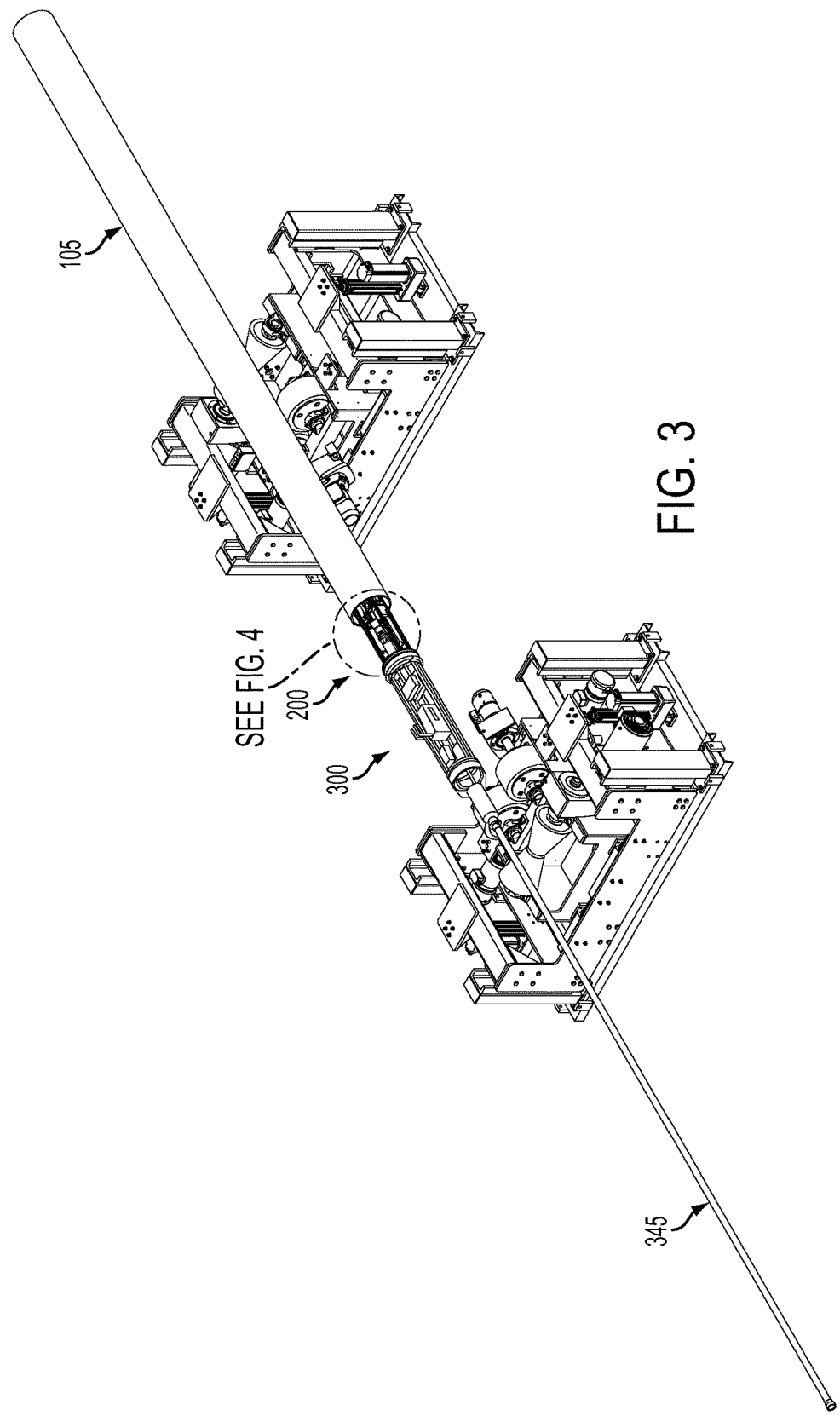
FIG. 3 illustrates the system of FIG. 1 showing a welding mechanism inserted into a segment according to FIG. 1.

Referring to FIGS. 1-3, the system for welding pipeline segments together is described as follows. FIG. 1 shows an external alignment mechanism 10A and 10B which is capable of supporting, positioning, and repositioning multiple lengths of pipeline. Each mechanism 10A and 10B may include supports (e.g., rollers) upon which a length of pipeline may be supported. A longitudinal roller 12 moveably supports pipeline segment 105 such that segment 105 may be repositioned along its longitudinal direction defined by arrow A. In addition, rotational rollers 14 are rotatable about an axis parallel to axis A-A of support segment 105 on either side of segment 105 enabling them to rotate or adjust the angular orientation of segment 105 about axis A-A. External alignment mechanism 10 is able to automatically manipulate multiple segments into various positions and orientations via motors, hydraulics, etc. For example the segments may be raised, lowered, rotated, tilted, pivoted, etc.

As shown in FIG. 1, external alignment mechanisms 10A and 10B support multiple segments 105, 110 and adjust their position and orientation until segments 105, 110 are both aligned such that their longitudinal axes A-A are collinear and one end of each of the segments 105, 110 abuts at interface edges. Specifically, FIG. 2 illustrates an enlarged view of detail 100 of FIG. 1 in which the edges form a pipe interface 120 (known as a "fit up" joint).

The pipeline aligning and welding system of the present invention applies a weld to the interior of the interface 120 from inside the fitted up segments 105, 110. To apply a weld to the interior of joint 120, an internal welding mechanism 300 is rolled into an end of one of the segments 105 as shown in FIG. 3. A second segment 110 is then placed on external alignment mechanism 10B and manipulated until both segments 105, 110 are satisfactorily aligned. An external force may then be applied to a reach rod 345 of the internal welding mechanism 300 or the mechanism may include automatic self propulsion means for adjusting its axial position within the aligned segments 105, 110.

As shown in FIGS. 4-7, welding mechanism 300 includes a carriage 301 and a welding portion 302. Carriage 301 includes at least one alignment mechanism 340A, 340B which may expand radially to engage the interior surface of segments 105 or 110. This expansion and engagement both secures the axial/longitudinal position of welding mechanism 300 relative to segment 105, 110 and aligns or radially centers welding mechanism 300 within segments 105, 110. Carriage 301 also includes a body 311 on which rotating mechanism 335 is supported. Body 311 is comprised of multiple elongated structural support members that extend between alignment mechanism 340A and 340B. As discussed below welding portion 302 includes a similar corresponding structure 313.

Welding portion 302 is rotatably connected to carriage 301 and extends from an end of carriage 301. The relative rotation between carriage 301 and welding portion 302 is facilitated by a rotary mechanism 335. Rotary mechanism 335 is secured to carriage 301 and automatically (via a motor and gears) rotates welding portion 302 relative to carriage 301 about longitudinal axis A. Welding portion 302 may be cantilevered from carriage 301 or may be supported by an additional alignment mechanism 340C located so that torch 305 is positioned between alignment mechanisms 340B and 340C. When alignment mechanism 340C is provided, welding portion 302 is rotatable relative to and between both alignment mechanisms 340B and 340C when alignment mechanisms 340B and 340C expand to secure themselves to the interior of a segment. Furthermore, carriage 301 may include a reach rod 345 which can be structured as an elongated extension from carriage 301 which an operator may grasp to insert/push or retract/pull welding mechanism 300 to axially position it within a segment 105, 110.

Figure 4:
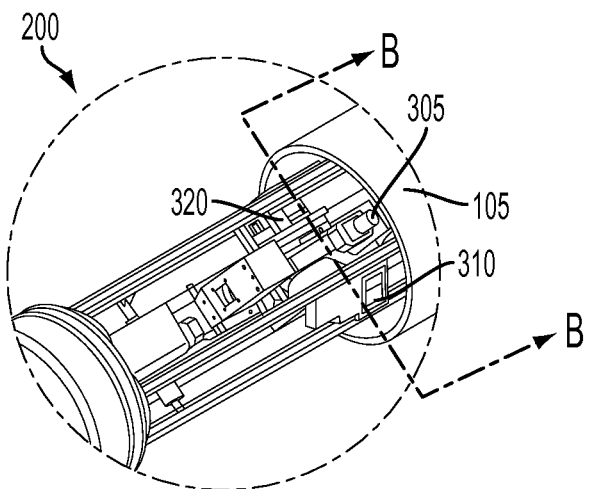
FIG. 4 illustrates an enlarged view of a section of FIG. 3 showing the welding portion of the welding mechanism positioned for welding in a pipe segment according to FIG. 1.
Figure 5:
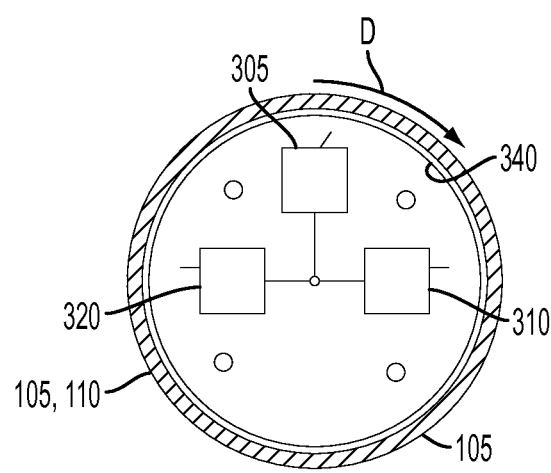
FIG. 5 illustrates a cross-sectional view of FIG. 4 cut through B-B showing the arrangement of various weld portion elements.

FIG. 4 shows an enlarged view of section 200 of FIG. 3 in which only segment 105 is present and segment 110 is absent. As shown in FIG. 4, welding portion 302 includes a welding group 303 which comprises a torch 305, a laser sensor 310, and a color camera 320. Welding portion 302 further has a body 313 on which torch 305, laser sensor 310, and color camera 320 are supported. Laser 310 tracks an interior joint of segments 105, 110, and detects an interface profile to be used to position torch 305 in applying a weld to the joint interface. Body 313 extends between alignment mechanism 340B and 340C. Section 200 shows welding mechanism 300 located inside segment 105 with torch 305 generally pointed in a radially outward direction and positioned to apply a weld to face joint 120. FIG. 5 shows an embodiment of a general schematic cross-sectional view of welding mechanism 300 through section B-B which shows welding group 303 looking in the direction of insertion of welding mechanism 300. FIG. 5 also shows a direction D of rotation of welding group 303 when it is rotated by rotary mechanism 335. Therefore, a welding action on a particular point along weld joint 120 will first be acted on by laser sensor 310 followed by torch 305 and finally by 2D inspection camera 320.

Figure 10:
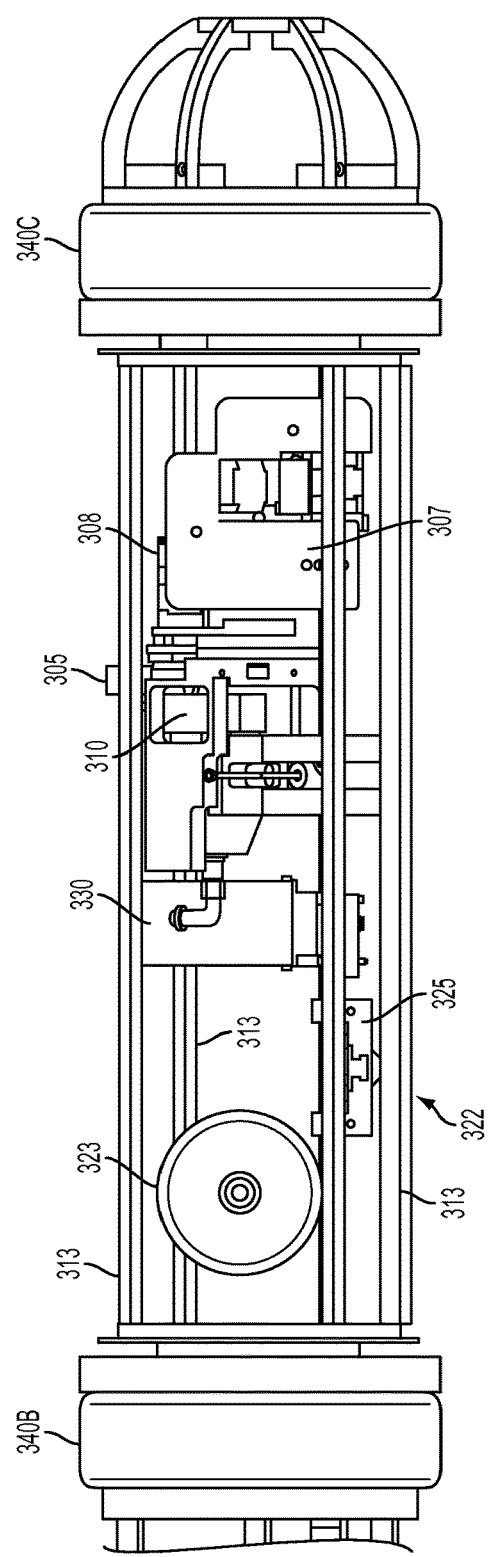
FIG. 10 illustrates a side view of the welding portion of the system of FIG. 1.
Figure 11:
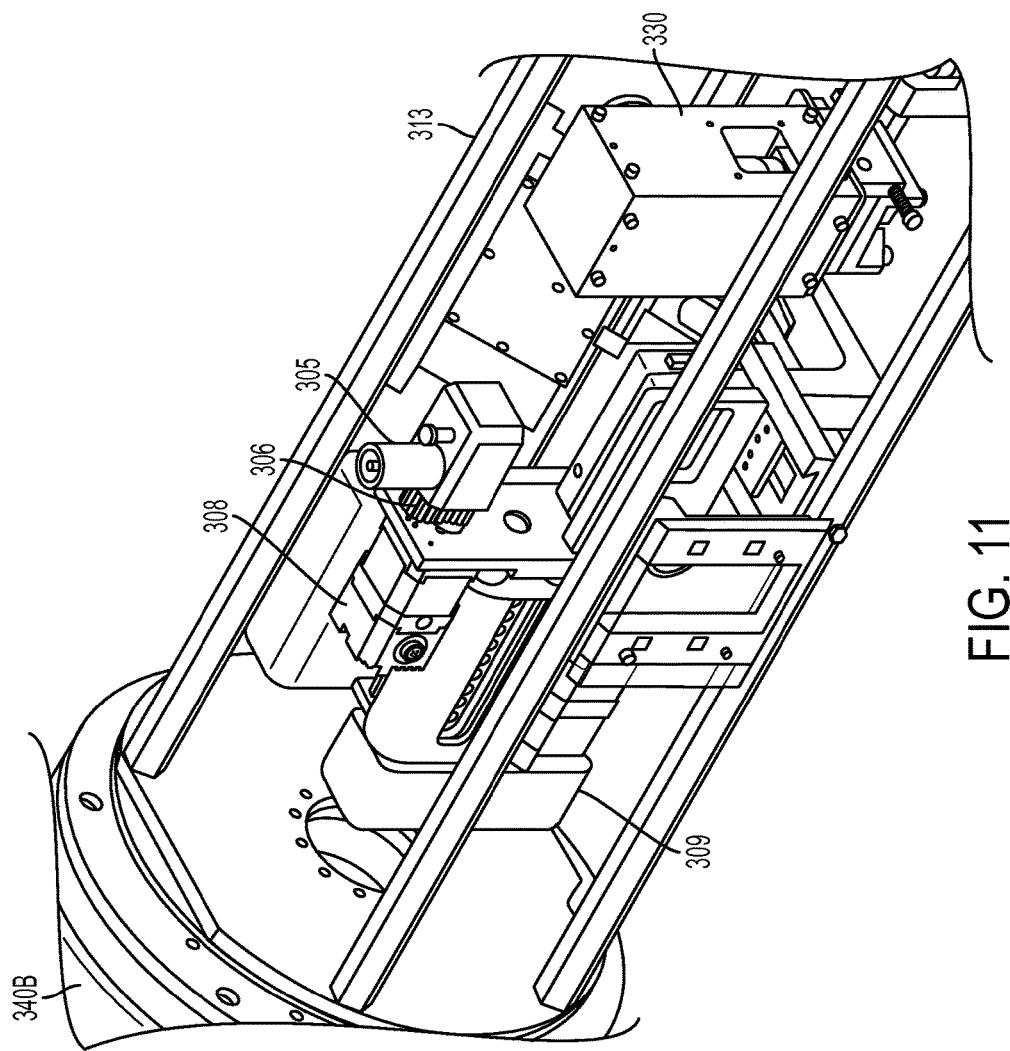
FIG. 11 illustrates an enlarged perspective view of a section of the welding portion of the system of FIG. 1.
Figure 12:
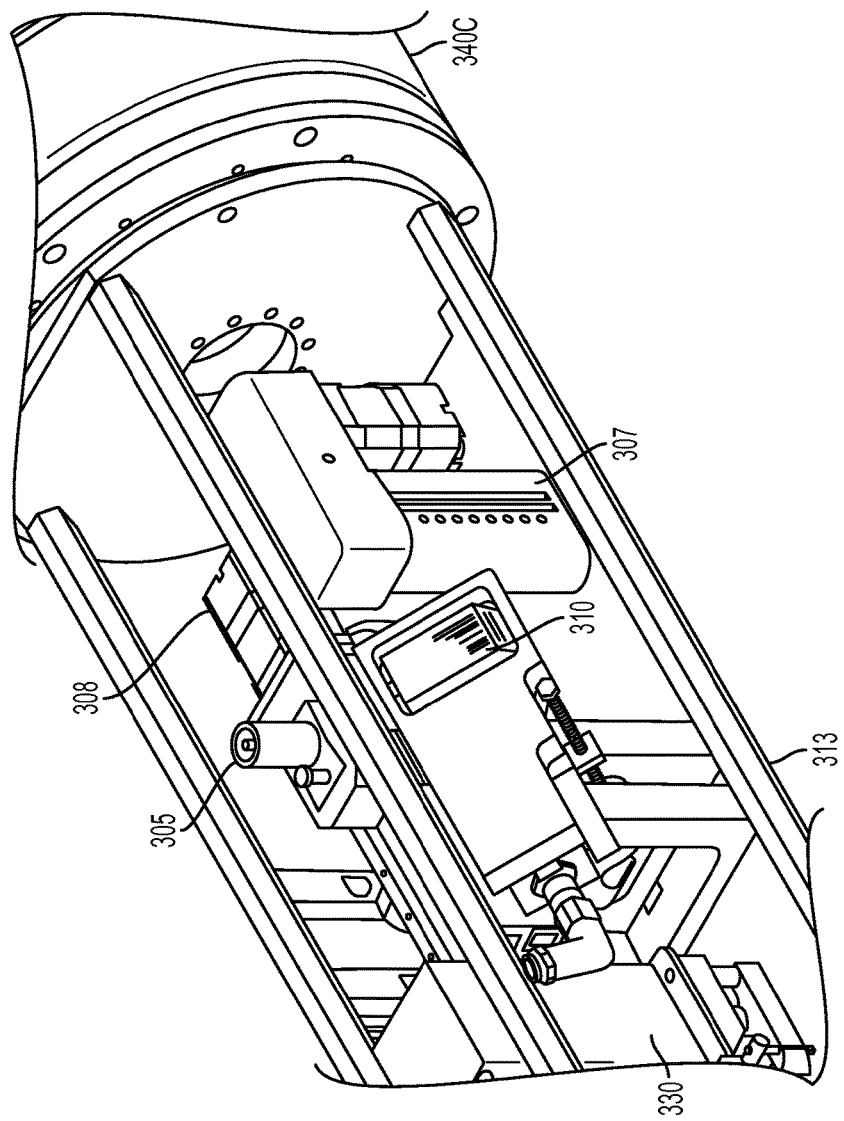
FIG. 12 illustrates another enlarged perspective view of a section of the welding portion of the system of FIG. 1.

FIGS. 10-12 illustrate multiple perspectives of the welding portion 302. FIG. 10 shows a wire delivery system 322. Wire delivery system 322 includes a wire spool storage 323, an optional wire straightener 325, and a wire feed mechanism 330 which is automatically controlled to deliver the appropriate amount of wire to torch 305. As rotary mechanism 335 rotates welding portion 302, wire is fed to the torch 305 by wire delivery mechanism 322.

As mentioned above, torch 305 may be positioned and oriented in multiple ways by multiple mechanisms. Torch 305 is supported on a manipulator. The manipulator includes a radial positioner, an axial positioner and a pivoter. Specifically, a radial positioner 307 (e.g., a rack and pinion) on which torch 305 is supported is capable of moving the torch radially toward and away from the interior surface of segments 105, 110. In other words, towards and away from the interface of segments 105, 110 to be welded. In addition, an axial positioner 309 (e.g., a rack and pinion) may move torch 305 axially within segments 105, 110. The manipulator also includes a pivoter 308 that allows the torch to pivot (e.g., about an axis parallel to segment longitudinal axis A-A). Pivotal movement by pivoter 308 may be powered by a motor and gears 306. For example, the motor may be a stepper motor.

The torch manipulator may compound the manipulative movements of the above mentioned elements by dependently supporting the elements. For example, body 313 may support the axial positioner which in turn supports the radial positioner which in turn supports the pivoter which in turn supports the torch. Similarly, the axial positioner may be supported by the radial positioner. Furthermore, any order of support may be employed.

The elements of the manipulator are controlled by a controller which receives as input, a series of signals including a signal from laser 310 and then processes the information before transmitting a signal to at least radial positioner 307, axial positioner 309, pivoter 308, and wire delivery system 322. Torch 305 is then repositioned and reoriented continuously according to predetermined parameters of the controller based on signals from profile reading laser 310.

Figure 8:
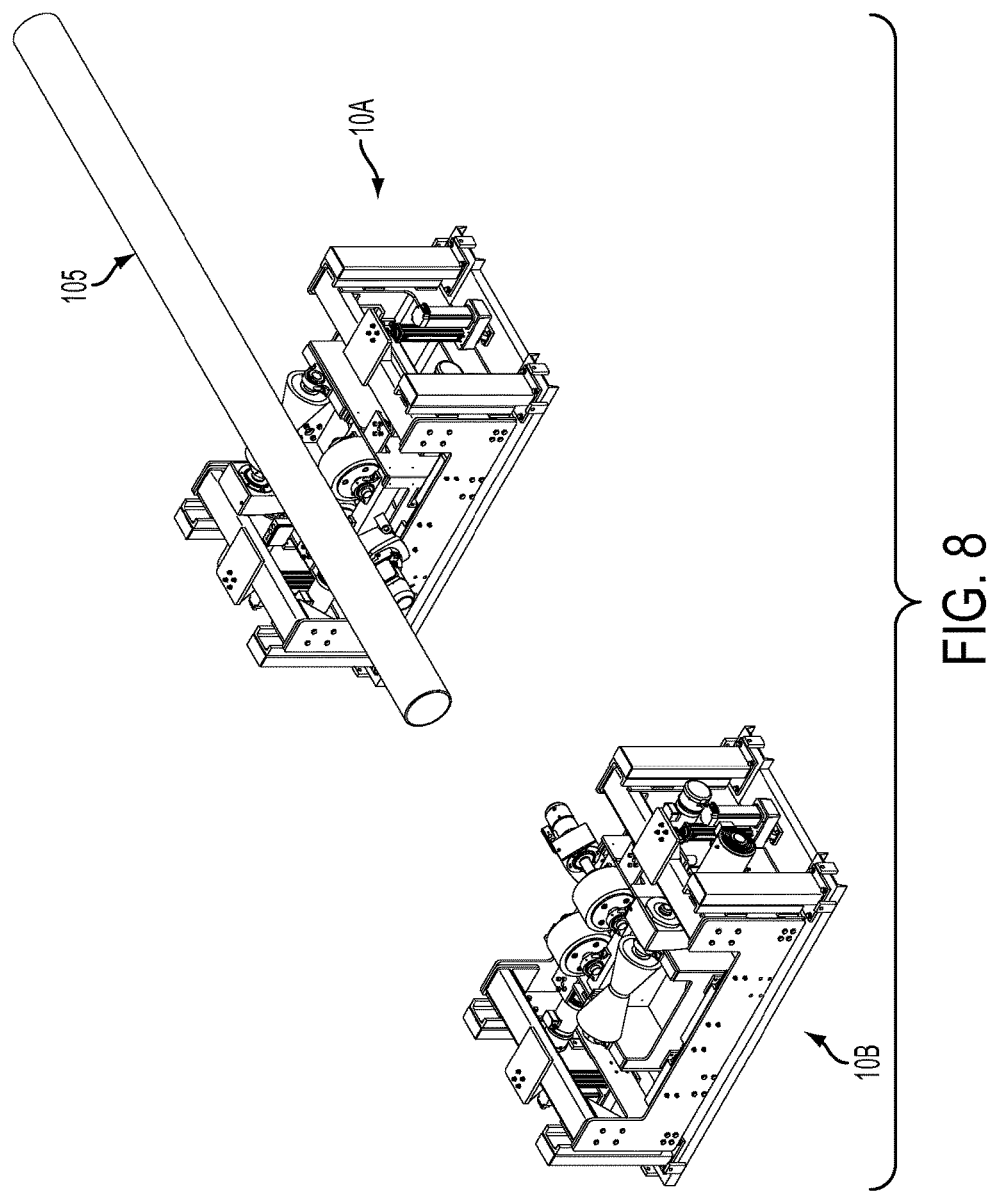
FIG. 8 illustrates a perspective view of the system of FIG. 1 in a configuration showing a first step of use in which a pipe segment is place on an external alignment mechanism.
Figure 9:
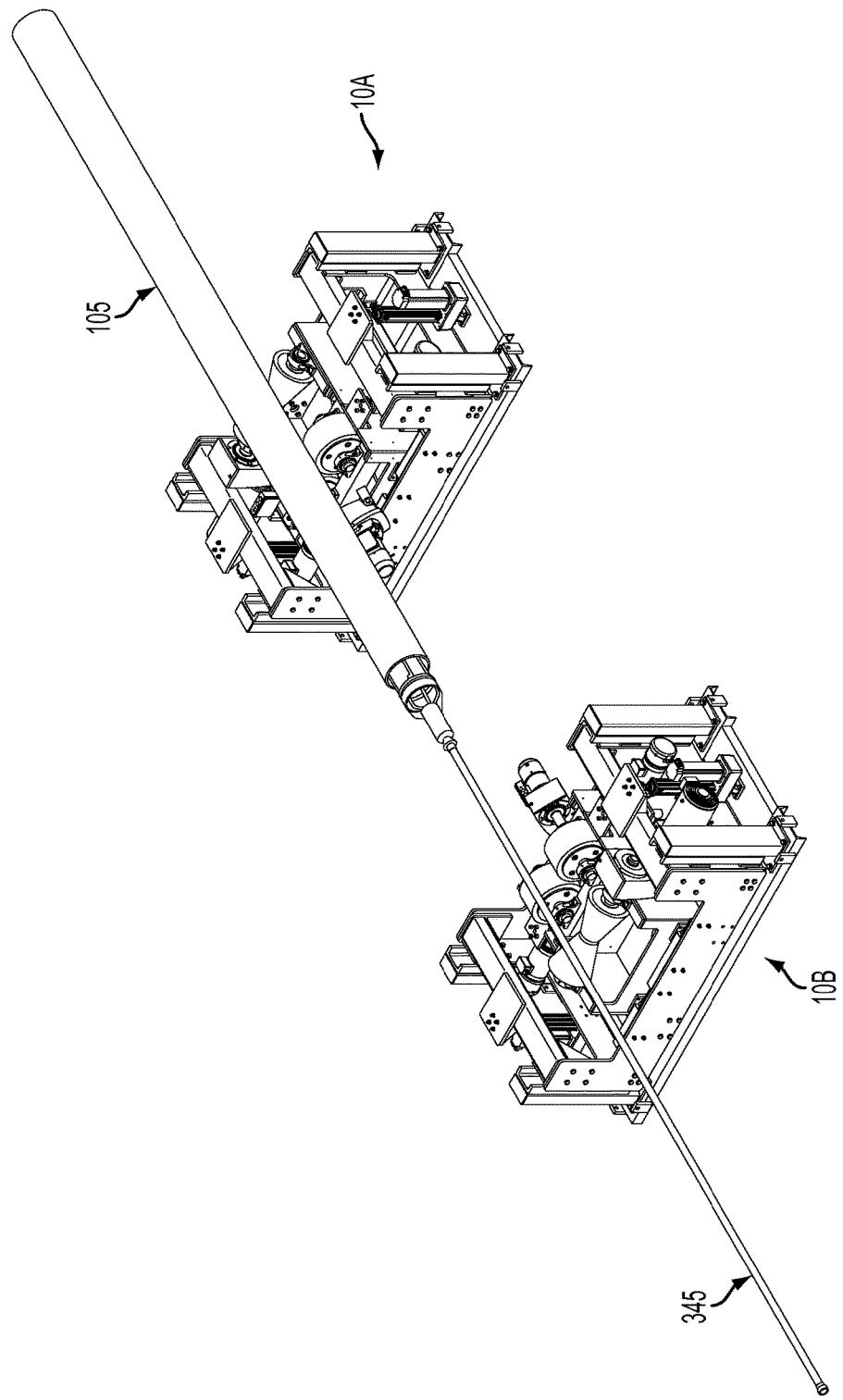
FIG. 9 illustrates a perspective view the system of FIG. 1 in a configuration showing a step subsequent to FIG. 8 in which a welding mechanism is inserted into a pipe segment.

The operation of the present invention internal welding system will now be described. FIGS. 1, 8 and 9 illustrate the process of positioning and welding segments 105 and 110 together. In operation, one or more of the following lettered steps may be executed so that: a) a pipe segment 105 is placed on alignment device/pipe stand 10A; b) internal welding machine 300 is then inserted into pipe segment 105; c) a second pipe segment 110 is then aligned with pipe segment 105 and welding mechanism 300 is pulled forward by reach rod 345 or automatically driven so that torch 305 generally lines up with faces joint 120 of pipe segments 105, 110; d) alignment mechanisms 340A, 340B (and if necessary 340C) are then engaged to secure welding mechanism 300 within pipe segments 105, 110; e) in one embodiment (optional), rotary mechanism 335 rotates weld head 305 to perform an initial scan of interface joint 120 of pipe segments 105, 110 by laser sensor device 310 to ensure optimal fit up; f) if required, steps (c), (d) and (e) may be repeated, i.e. pipe segments 105, 110 are realigned/rotated and rescanned by laser 310, to improve "fit up"; g) optionally, internal alignment mechanism 340C on the rear of the welding mechanism 300 is engaged to hold the axial position of welding mechanism 300 with respect to both pipe sections 105, 110; h) with welding mechanism 300 secure in pipe segments 105 and 110, the root weld (first weld) cycle begins so that laser 310 scans pipe interface 120, torch 305 follows laser 310, and the output from laser 310 is used to control the position of articulated torch 305, where the position and orientation of torch 305 with respect to the interface 120 is controlled so as to produce the best quality weld; i) in addition to a signal from laser 310, thru the arc current monitoring can also be used in directing the torch position; j) after the completion of a 360° weld, weld head 305 is rotated back to an original position; k) the profile (using laser 310) and the visual inspections (with 2D color camera 320) are performed either in the previous step (j) or on a separate inspection run; 1) after inspection, aligning mechanism 340A-C are released and welding mechanism 300 is pulled or driven forward towards the open end of welded pipe 105, 110 and with the nose of welding mechanism 300 exposed, like (b), pipe segment 110 is placed on external alignment mechanism 10B and advanced to the next joint; m) steps (c) to (1) are then repeated for the entire production run.

In one embodiment, a signal from laser sensor 310 is sent to an electronic controller of external alignment mechanism 10 to automatically reposition one or both of segments 105, 110 for a more desirable face joint 120 arrangement. Furthermore, the foregoing steps may be executed in the stated order. However, variations in the order are also contemplated.

In another embodiment, instead of stopping after the first 360° weld, the rotation is continued to lay another weld pass, the laser could be used to inspect & track simultaneously while the trailing 2D color camera continues inspection after the second weld.

In still another embodiment, instead of welding a complete 360° weld, the weld is performed in two 180° halves with the same start position. This implementation would require either multiple laser sensors for tracking or a mechanism to physically oscillate the laser and/or the torch in order to maintain the tracking sensor's lead position in both directions of rotation (i.e., rotate the torch and laser so that they switch positions).

While the present invention has been described in detail and with reference to specific embodiments thereof, it will be apparent to one skilled in the art that various changes and modifications can be made therein without departing from the spirit and scope thereof. Thus, it is intended that the present invention covers the modifications and variations of this invention provided they come within the scope of the appended claims and their equivalents. It is to be understood that terms such as "top", "bottom", "front", "rear", "side", "height", "length", "width", "upper", "lower", "interior", "exterior", and the like as may be used herein, merely describe points of reference and do not limit the present invention to any particular orientation or configuration.

The invention claimed is:

1. A system for aligning and welding together two segments of a pipe, comprising:
a welding mechanism configured to apply a weld to a face joint of the two segments, the welding mechanism including an articulating torch, a laser sensor configured to read a profile of the face joint, and an electronic controller configured to receive information signals from the laser sensor to control a position or orientation, or both the position and orientation, of the torch; and
an external alignment mechanism configured to manipulate orientation of a longitudinal axis of at least one of the segments relative to the other,
wherein the welding mechanism further includes a welding portion and a carriage, the carriage having an internal alignment mechanism,
wherein the welding mechanism is movable within at least a first of the two segments such that the torch becomes aligned with the face joint between the two segments and so that the internal alignment mechanism then radially expands to engage an interior surface of the pipe to hold a longitudinal position of the welding mechanism in place,
wherein the welding portion is configured to rotate relative to the carriage within the pipe about the longitudinal axis of at least one of the two segments, and
wherein the torch and the laser sensor are rotatably supported by the welding portion such that during welding, the torch follows the laser sensor along the face joint.

2. The system of claim 1 wherein, the welding mechanism further includes a camera for optically sensing the face joint.

3. The system of claim 2, wherein the camera follows the torch along a weld joint path, the camera sending a signal to an operation station display to allow an operator to inspect an image of a portion of the weld.

4. The system of claim 1, wherein an articulating movement of a torch head on the torch includes one or more of radial translation movements toward and away from the face joint, translation movement in a direction of the longitudinal axis, pivotal movement relative to the welding mechanism about an axis that is parallel to the longitudinal axis, and pivotal movement relative to the torch head about an axis that is perpendicular to the longitudinal axis.

5. The system of claim 1, wherein the welding mechanism rotates within and relative to an interior of the face joint of the two segments so that the torch follows the laser sensor, the laser sensor providing continuous face joint profile data to the electronic controller which in turn continuously directs the positioning of the torch.

6. The system of claim 1, wherein the holding of the longitudinal position of the welding mechanism in the pipe comprises a locking of the longitudinal position of the welding mechanism relative to the two segments while the welding portion rotates.

7. The system of claim 1, wherein the articulation of the torch includes radial translation movements toward and away from the face joint, an axial translation movement in a direction of the longitudinal axis, and a pivotal movement relative to the welding mechanism about an axis that is parallel to the longitudinal axis or relative to a torch head on the torch about an axis that is perpendicular to the longitudinal axis.

8. A system for aligning and welding together two segments of a pipe, comprising:
a welding mechanism configured to apply a weld to a face joint of the two segments, the welding mechanism including:
an articulating torch,
a laser sensor configured to read a profile of the face joint,
a carriage,
a welding portion,
a second internal alignment mechanism, and
an electronic controller configured to receive information signals from the laser sensor to control a position or orientation, or both the position and orientation, of the torch,
wherein the carriage is configured to hold a longitudinal position of the welding mechanism in the pipe, the carriage including a first internal alignment mechanism configured to radially expand at a first side of the torch to engage an interior surface of a first of the two segments,
wherein the welding portion is configured to rotate relative to the carriage within the pipe,
wherein the second internal alignment mechanism is configured to radially expand at a second side of the torch, opposite the first side, to engage an interior surface of a second of the two segments, and
wherein the torch and the laser sensor are rotatably supported by the welding portion such that, during welding, the torch follows the laser sensor along the face joint as the torch rotates about a longitudinal axis.

9. The system of claim 8, further comprising:
an external alignment mechanism configured to manipulate an orientation of one of the two segments relative to the other along the longitudinal axis by contact with an exterior of the one segment.

10. The system of claim 9, wherein the electronic controller receives a signal from the laser sensor such that the external alignment mechanism, responsive to the signal, adjusts the relative positions of the two segments based on predetermined alignment parameters.

11. The system of claim 8, wherein the carriage includes a third internal alignment mechanism configured to radially expand to engage the interior surface of the first of the two segments.

12. The system of claim 11, wherein the laser sensor is positioned between two of the internal alignment mechanisms.

13. The system of claim 8, wherein the torch is rotatable by the welding portion through a 360° weld.

14. The system of claim 8, wherein the torch is positioned between the first and second internal alignment mechanisms.

15. The system of claim 14, further comprising a third internal alignment mechanism configured to radially expand to engage an interior surface of one of the two segments.

16. The system of claim 8, wherein the holding of the longitudinal position of the welding mechanism in the pipe comprises a locking of the longitudinal position of the welding mechanism relative to the two segments while the welding portion rotates.

17. The system of claim 8, wherein the articulation of the torch includes radial translation movements toward and away from the face joint, an axial translation movement in a direction of the longitudinal axis, and a pivotal movement relative to the welding mechanism about an axis that is parallel to the longitudinal axis or relative to a torch head on the torch about an axis that is perpendicular to the longitudinal axis.

18. A system for aligning and welding together two segments of a pipe, comprising:
- a welding mechanism configured to apply a weld to a face joint of the two segments, the welding mechanism including an articulating torch, a laser sensor configured to read a profile of the face joint, and an electronic controller configured to receive information signals from the laser sensor to control a position or orientation, or both the position and orientation, of the torch;
- an alignment mechanism configured to manipulate an orientation of a longitudinal axis of at least one of the two segments relative to the other,
- wherein the electronic controller receives a signal from the laser sensor such that the alignment mechanism adjusts the relative positions of the two segments responsive to the signal,
- wherein the welding mechanism further includes a carriage for holding a longitudinal position of the welding mechanism in the pipe and a welding portion configured to rotate relative to the carriage within the pipe, and
- wherein the torch and the laser sensor are rotatably supported by the welding portion such that during welding, the torch follows the laser sensor along the face joint.

19. The system of claim 18, wherein the carriage includes at least a first internal alignment mechanism configured to radially expand at a first side of the torch to engage an interior surface of a first of the two segments, and wherein the welding mechanism includes a second internal alignment mechanism configured to radially expand at a second side of the torch, opposite the first side, to engage an interior surface of a second of the two segments.

20. The system of claim 18, wherein the torch rotates about the longitudinal axis, and wherein a torch head on the torch moves axially along the pipe relative to the carriage.

* * * * *